Patented June 10, 1952

2,600,217

UNITED STATES PATENT OFFICE 2,600,217

DIARYL-HYDROXYALKYL-DIAMINO COMPOUNDS AND PREPARATION THEREOF

John J. Denton and Harold P. Schedl, Bound Brook, N. J., assignors to American Cyanamid Company, New York, N. Y., a corporation of Maine No Drawing. Application June 22, 1948,
Serial No. 34,547

13 Claims. (Cl. 260—570.6)

This application relates to new organic compounds and to processes of preparing the same.

The new compounds of the present invention may be represented by the following general formula:

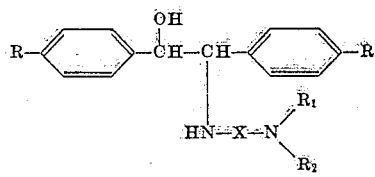

In the above formula R represents hydrogen or a halogen, X represents an alkylene radical of two or three carbon atoms and $R_1$ and $R_2$ represent alkyl radicals or together with the nitrogen atom constitute a heterocyclic radical such as piperidyl or morpholinyl. The salts of these compounds with acids are also included within the scope of the invention.

Many of the compounds having the above formula are active analgesic agents, and some are hypnotics. Others are tuberculostatic. The compounds are, therefore, of value in medicine and in the preparation of other pharmaceuticals.

The compounds of the present invention are prepared by alkylating a 1,2-diphenyl-2-aminoethanol having a desired substituent on the benzene rings with an appropriate aminoalkyl halide under the conditions to be described hereinafter. The reaction may be illustrated by the following equation which shows the production of the compound of Example 1:

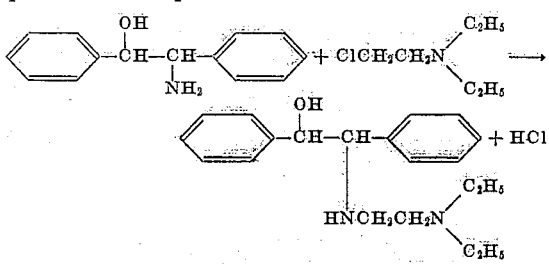

The acid salts of the 1,2-diphenyl-2-aminoethanol and the acid salts of the aminoalkyl halide may also be used in the reaction as well as the free bases as illustrated above.

The reaction is conducted by merely mixing substantially equimolar quantities of the reactants in an aqueous solvent in the presence of an excess of an acid binding or acid accepting substance such as potassium bicarbonate, calcium hydroxide, sodium hydroxide or the like. The amount of this acid binding substance should be at least sufficient to neutralize the acid from the original amine and the aminoalkyl halide, when such are used in the form of their acid salts, plus enough to react with the hydrogen halide liberated as the reaction proceeds. Other solvents, including dioxane and the lower alcohols, may also be used in whole or in part as a medium in which to conduct the reaction. The temperature of the reaction mixture may vary widely from approximately 0° C. up to the refluxing temperature of the solvent and even higher if desired. It is preferred that the reaction be conducted within the range 40° to 85° C.

It will be seen from stereochemical considerations that the starting material, 1,2-diphenyl-2-aminoethanol, contains two dissimilar asymmetrical carbon atoms, and there should be four optically active forms or two racemic mixtures of the compound. Both racemates are known, and each had been resolved to its optical antipodes. The two racemates are differentiated in the literature by being referred to as the dl- and the dl-iso forms. These differ in melting point, solubility, and other physical and chemical properties. The physiological properties of the compounds of the present invention differ also in important respects. The compounds prepared from the dl-iso-1,2-diphenyl-2-aminoethanols have the greatest analgesic effects and are the preferred compounds of the present invention. The racemates are distinguished herein by the term -iso- which refers to the product made from, or corresponding to that made from, the 1,2-diphenyl-2-aminoethanol racemate having the lower melting point. As will be seen, the dl-iso- product does not necessarily have the lower melting point, as is the case with the starting material.

The preparation of representative products of the present invention will now be illustrated by means of specific examples. All parts are by weight unless otherwise indicated.

EXAMPLE 1

*dl - iso - 1,2 - diphenyl - 2 - (2 - diethylaminoethylamino) ethanol and dihydrochloride*

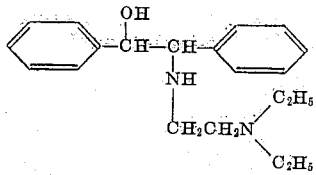

To a reaction vessel are charged 63.9 parts of dl-iso-1,2-diphenyl-2-aminoethanol, 67.2 parts of sodium bicarbonate, 450 parts by volume of alcohol and 150 parts by volume of water. To this there is gradually added 51.6 parts of 2-chlorotriethylamine hydrochloride. The resulting mixture is heated under reflux until the reaction has proceeded essentially to completion. This is indicated by the cessation of the evolution of carbon dioxide. The reaction mixture is then poured into water. The product, which separates as an oil, is extracted with ether. Treatment of the ethereal solution with anhydrous hydrogen chloride precipitates the dihydrochloride. On purification by recrystallization the dihydrochloride melts at 209.5°–211.5° C.

The monohydrochloride of the above compound is obtained by treatment of the free base with one mole of hydrochloric acid. Other acid salts such as the sulphate, acetate, citrate and the like of the above compound as well as of the others described herein, are obtained by neutralization of the free base with the appropriate acid.

In place of 2-chloro-triethylamine hydrochloride, there may be used 2-bromo-triethylamine to obtain the same product. Other 2-halo-trialkylamines may be used.

EXAMPLE 2

*dl - 1,2 - dephenyl - 2 - (2 - diethylaminoethylamino) ethanol*

By substituting an equivalent amount of dl-1,2-diphenyl-2-aminoethanol for the dl-iso-1,2-diphenyl-2-aminoethanol in Example 1, dl-1,2-diphenyl - 2 - (2 - diethylaminoethylamino) ethanol is obtained as a solid, melting point 104.8°–106.4° C. Its monohydrochloride melts at 132.2°–134.8° C.

EXAMPLE 3

*dl-iso-1,2-diphenyl-2-[2-(1-piperidyl) ethylamino]ethanol and dihydrochloride*

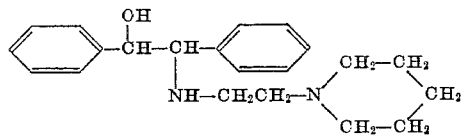

To a reaction vessel are charged 63.9 parts of dl-iso-1,2-diphenyl-2-aminoethanol, 67.2 parts of sodium bicarbonate, 450 parts by volume of alcohol and 150 parts by volume of water. To this there is gradually added 60.7 parts of 1-(2-chloroethyl) piperidine hydrochloride. The resulting mixture is heated under reflux until the reaction has proceeded essentially to completion. This is indicated by the cessation of the evolution of carbon dioxide. The reaction mixture is then poured into water. The product, which separates as a solid, is collected on a filter and dried. This solid on purification by recrystallization from alcohol melts at 130°–132° C. It may be converted in the usual ways to a solid dihydrochloride, melting point 235°–238° C.

EXAMPLE 4

*dl-1,2-diphenyl-2-[2-(1-piperidyl)-ethylamino]ethanol*

By substituting an equivalent amount of dl-1,2-diphenyl-2-aminoethanol for the dl-iso-1,2-diphenyl-2-aminoethanol in Example 3, there is obtained dl-1,2-diphenyl-2-[2-(1-piperidyl) ethylamino]ethanol, melting point 128.8°–130° C. Its monohydrochloride melts at 209.0°–210.5° C.

EXAMPLE 5

*dl-1,2-diphenyl-2-[2-(4-morpholinyl) ethylamino]ethanol and dihydrochloride*

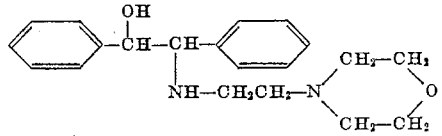

By substituting an equivalent amount of 4-(2-chloroethyl) morpholine hydrochloride for the 1-(2-chloroethyl) piperidine hydrochloride in Example 3, the above compound is obtained, melting point 104.5°–106° C. Its dihydrochloride melts at 243°–245° C.

EXAMPLE 6

*dl-1,2-diphenyl-2-[2-(4-morpholinyl) ethylamino]ethanol and hydrochloride*

To an autoclave are charged 106.1 parts of benzoin, 98.8 parts of 4-(2-aminoethyl) morpholine, 10 parts of Raney nickel catalyst, and 250 parts by volume of alcohol. This mixture is heated to 73°–77° C. and agitated while being treated with hydrogen at pressures of 500 to 600 lbs./sq. in. When the hydrogen pressure remains constant, the mixture is cooled to room temperature and the excess hydrogen is vented. The reaction mixture is then heated to boiling and filtered. On cooling the filtrate, the product separates as a solid which may be collected on a filter and dried. This solid, on further purification by recrystallization from alcohol, melts at 118.9°–120.4° C. It may be converted in the usual ways to the monohydrochloride, melting point 230°–234° C.

This example represents another method of preparing the compounds of the present invention which is applicable, however, only to the dl- series.

EXAMPLE 7

*dl-iso-1,2-diphenyl-2-[1-(1-piperidyl) isopropylamino]ethanol and dihydrochloride*

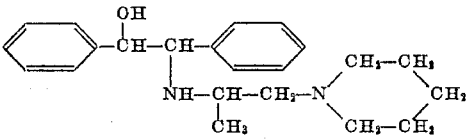

By substituting an equivalent amount of 1-(2-chloropropyl) piperidine hydrochloride for the 2-chlorotriethylamine hydrochloride in Example 1, the above compound is obtained. Its dihydrochloride melts at 258°–260° C. with decomposition.

EXAMPLE 8

*dl-iso-1,2-di(4-chlorophenyl)-2-[2-(1-piperidyl) ethylamino]ethanol and dihydrochloride*

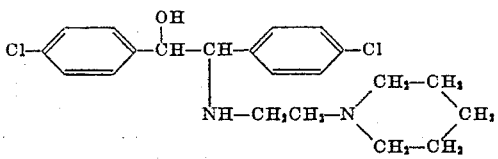

To a flask equipped with stirrer and placed in a constant-temperature bath at 60° C. is added 49.5 parts of glycine. A mixture of 281 parts of p-chlorobenzaldehyde dissolved at 60° C. in 340 parts by volume of alcohol is rapidly poured into the flask with stirring. To this, a solution at 60° C. of 80 parts sodium hydroxide in 760 parts of water is immediately added. This mixture is heated at 55°–60° C. for 24 hours and then allowed to stand at room temperature for two days. The mixture is chilled; and the white solid, which has separated during the reaction, is collected on a filter, washed with 30% alcohol, and dried. Extraction of this solid with 100 parts by volume of hot absolute alcohol leaves the crude benzylidene derivative as a white crystalline residue, melting point 141°–145° C.

To 1800 parts of water and 180 parts by volume of 5N hydrochloric acid is added 90 parts of the above benzylidene compound. The mixture is heated on a steam bath for one-half hour, cooled, diluted with 1200 parts water, and the oily p-chlorobenzaldehyde present is removed by extraction with ether. On neutralization with ammonia of the aqueous hydrolysis solution, dl-iso-1,2-di(4-chlorophenyl)-2-aminoethanol separates as a white solid. This solid, when isolated by filtration and dried, melts at 151.5°–152.5° C.

The following are charged to a reaction vessel: 27 parts of dl-iso-1,2-di(4-chlorophenyl)-2-aminoethanol hydrochloride, 32.4 parts of sodium bicarbonate, 150 parts by volume of alcohol, and 50 parts by volume of water. To this are gradually added 20.4 parts of 1-(2-chloroethyl)-piperidine hydrochloride. The resulting mixture is heated under reflux until the reaction has proceeded essentially to completion. The reaction mixture is then poured into water. The product separates as a solid, is collected on a filter, and dried. This solid, if further purified by recrystallization from alcohol, melts at 153°–154.5° C. The corresponding dihydrochloride, prepared in the usual ways, melts at 248°–251° C. with decomposition.

EXAMPLE 9

*dl-iso-1,2-di(4-chlorophenyl)-2-[2-(4-morpholinyl)ethylamino]ethanol and dihydrochloride*

By substituting an equivalent amount of 4-(2-chloroethyl)morpholine hydrochloride for the 1-(2-chloroethyl)piperidine hydrochloride in Example 8, the above compound, m. p. 153°–155° C., is obtained. Its dihydrochloride melts at 265°–270° C. with decomposition.

EXAMPLE 10

*dl-iso-1,2-di(4-chlorophenyl)-2-(2-diethylaminoethylamino) ethanol and dihydrochloride*

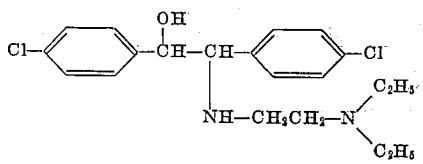

The above compound is obtained by substituting an equivalent amount of 2-chlorotriethylamine hydrochloride for the 1-(2-chloroethyl)-piperidine hydrochloride in Example 8. Its dihydrochloride melts with decomposition at 253°–259° C.

We claim:

1. Compounds of the group consisting of those having the general formula

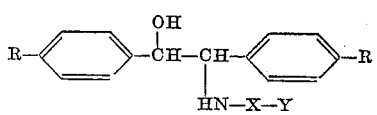

in which R is a member of the group consisting of hydrogen and halogen radicals, X is an alkylene radical of two to three carbon atoms and Y is a radical of the group consisting of 1-piperidyl, 4-morpholinyl and those represented by

in which $R_1$ and $R_2$ are lower alkyl radicals, and the acid salts of said compounds.

2. Compounds having the general formula

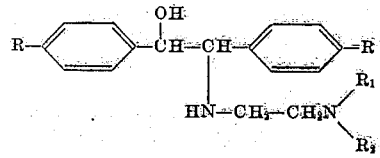

in which R is a halogen and $R_1$ and $R_2$ are lower alkyl radicals.

3. Compounds having the general formula

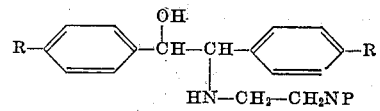

in which R is a halogen and the group —NP represents a piperidyl radical.

4. Compounds having the general formula

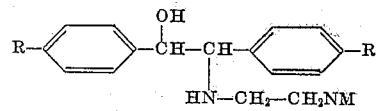

in which R is a halogen and the group —NM represents a morpholinyl radical.

5. di-iso-1,2-diphenyl-2-(2-diethylaminoethylamino) ethanol.

6. dl-1,2-diphenyl-2-[2-(4-morpholinyl) ethylamino] ethanol.

7. dl-iso-1,2-di(4-chlorophenyl)-2-[2-(1-piperidyl)ethylamino]ethanol.

8. A method of preparing compounds having the general formula

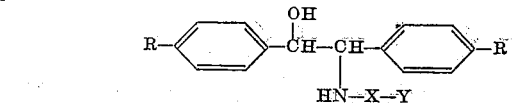

in which R represents a member of the group consisting of hydrogen and halogen radicals, X represents an alkylene radical of two to three carbon atoms and Y represents a radical of the group consisting of 1-piperidyl, 4-morpholinyl, and those represented by

in which $R_1$ and $R_2$ are lower alkyl radicals, which comprises mixing together in an aqueous solvent at a temperature within the range 0°–100° C. an acid binding substance a 1,2-diphenyl-2-aminoethanol of the formula

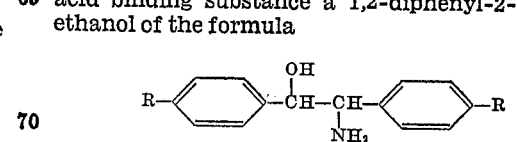

and an aminoalkyl chloride having the formula Cl—X—Y in which X and Y are as defined above and after reaction thereof recovering the said product.

9. A method of preparing compounds having the general formula

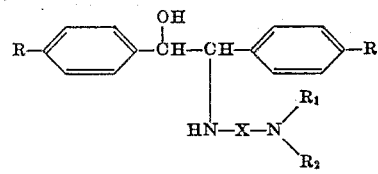

in which R represents a radical of the group consisting of hydrogen and halogen radicals, X represents an alkylene radical of two to three carbon atoms and R₁ and R₂ represent lower alkyl radicals, which comprises mixing together in an aqueous solvent at a temperature within the range 0° to 100° C. an acid binding substance, a 1,2-diphenyl-2-aminoethanol of the formula

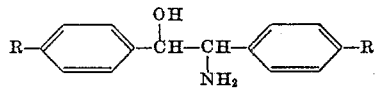

and an aminoalkyl chloride of the formula

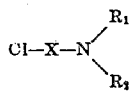

in which X is an alkylene radical, and R₁ and R₂ are lower alkyl radicals, and after reaction thereof recovering the said product.

10. A method of preparing compounds having the general formula

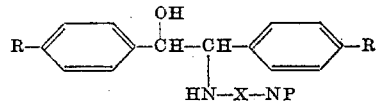

in which R represents a radical of the group consisting of hydrogen and halogen radicals, X is an alkylene radical of two to three carbon atoms and —NP is a piperidyl radical, which comprises mixing together in an aqueous solvent at a temperature within the range 0° to 100° C. an acid binding substance, a 1,2-diphenyl-2-aminoethanol of the formula

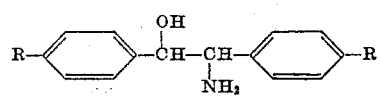

and an aminoalkyl chloride of the formula

Cl—X—NP in which X and NP are as defined above, and after reaction thereof recovering the said product.

11. A method of preparing compounds having the general formula

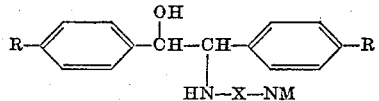

in which R represents a radical of the group consisting of hydrogen and halogen radicals, X is an alkylene radical of two to three carbon atoms and —NM is a morpholinyl radical, which comprises mixing together in an aqueous solvent at a temperature within the range 0° to 100° C. an acid binding substance, a 1,2-diphenyl-2-aminoethanol of the formula

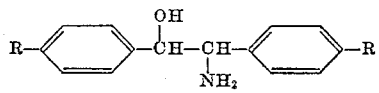

and an aminoalkyl chloride of the formula

Cl—X—NM in which —X—NM are as defined above, and after reaction recovering the said product.

12. A method of preparing dl-iso-1,2-diphenyl- - 2 - (2 - diethylaminoethylamino)ethanol which comprises mixing together in an aqueous solvent dl-iso-1,2-diphenyl-2-aminoethanol, 2-chlorotriethylamine hydrochloride and sodium bicarbonate and heating the reaction mixture at a temperature within the range 0° C. to 100° C. and thereafter recovering dl-iso-1,2-diphenyl-2-diethylaminoethylamino)ethanol.

13. A method of preparing dl-iso-1,2-di(4-chlorophenyl)-2-[2 - (1 - piperidyl)ethylamino]-ethanol which comprises mixing together in an aqueous solvent dl-iso-1,2-di[4-chlorophenyl]-2-aminoethanol hydrochloride, sodium bicarbonate and 1-[2-chloroethyl]-piperidine hydrochloride, heating the reaction mixture at a temperature within the range 0° C. to 100° C. and thereafter recovering dl - iso - 1,2-di(4-chlorophenyl)-2-[2-(1-piperidyl)ethylamino] ethanol.

JOHN J. DENTON.
HAROLD P. SCHEDL.

REFERENCES CITED

The following references are of record in the file of this patent:

FOREIGN PATENTS

| Number | Country | Date |
|---|---|---|
| 525,839 | Germany | May 29, 1930 |

OTHER REFERENCES

McKenzie et al.: "Ber. deut. chem.," 65, pp. 794–798 (1932).

Degering: "Org. Nitrogen Compounds" (Univ. Lithoprinters, Ypsilanti, Mich., 1945), p. 304.